(No Model.)
C. FOSDICK.
CRANK SHAFT.
No. 402,010. Patented Apr. 23, 1889.
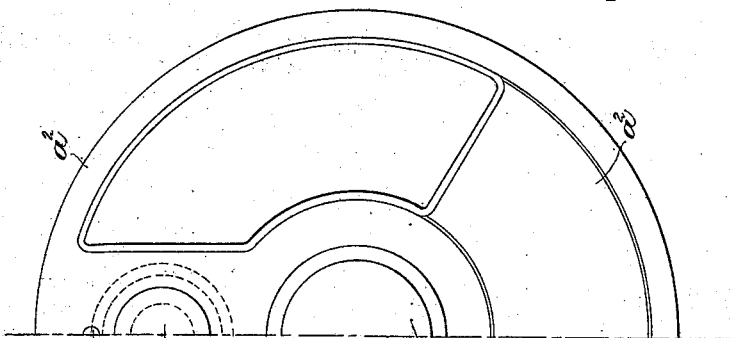
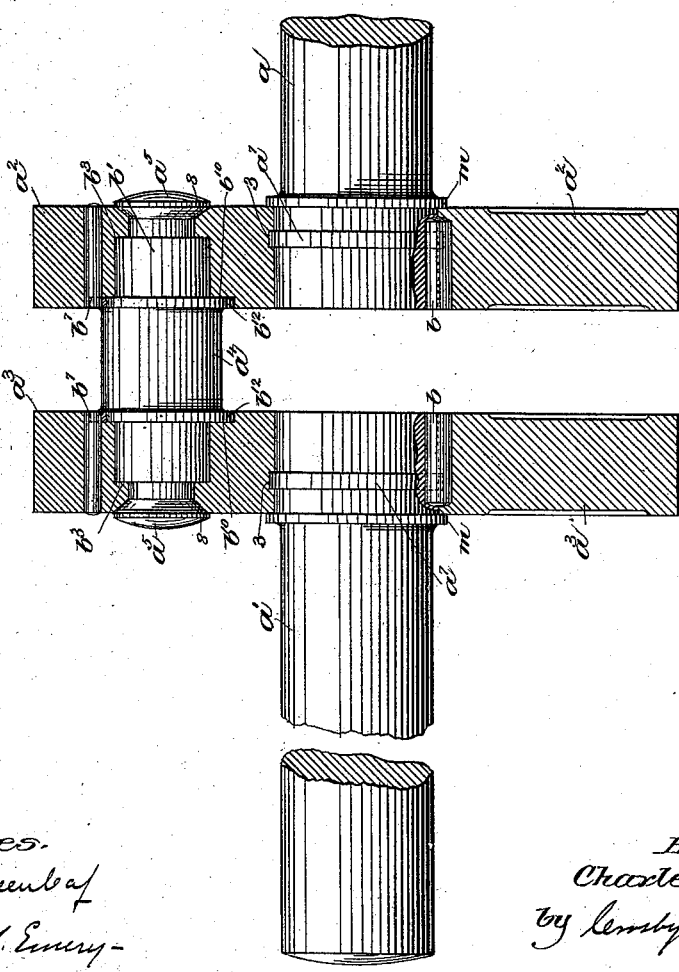
Witnesses.
Fred. S. Greenleaf
Fradrick L. Emery
Inventor.
Charles Fosdick.
by Crosby & Gregory
Attys

UNITED STATES PATENT OFFICE.

CHARLES FOSDICK, OF FITCHBURG, MASSACHUSETTS.

CRANK-SHAFT.

SPECIFICATION forming part of Letters Patent No. 402,010, dated April 23, 1889.

Application filed December 4, 1888. Serial No. 292,678. (No model.)

*To all whom it may concern:*

Be it known that I, CHARLES FOSDICK, of Fitchburg, county of Worcester, State of Massachusetts, have invented an Improvement in Crank-Shafts, of which the following description, in connection with the accompanying drawings, is a specification, like letters on the drawings representing like parts.

This invention relates to the production in a novel manner of a crank-shaft for steam-engines and other machinery, and has for its object to provide a crank-shaft in which the cranks or disks are more securely united together and to the journals of the shaft than has heretofore been done, thereby producing a crank-shaft possessing increased strength and durability, the term "journals" as herein used being intended to indicate that part of the shaft which is composed of two parts arranged in the same line and carrying, it may be, the usual balance or fly wheel, and it may be an eccentric, as now common in engine construction, the journal portions being of greater or less length, and being supported in the usual manner of crank-shafts in usual bearings. The disks referred to and carried by the journals are provided, as represented, each with a chamber, preferably of varying diameter and shaped to leave a shoulder against which may abut one end of a hollow sleeve, which, together with a bolt to be described, constitute the wrist or crank pin, the said sleeve and disks being firmly joined together by the said bolt, the latter being inserted through the disk and sleeve while hot, after which the hot bolt is headed and permitted to cool, the bolt in cooling contracting in length, so that the heads of the bolts, acting against the outer sides of the disks, serve to draw them together and the shoulders of the disks against the ends of the said sleeve.

Preferably the disks referred to will be bored centrally and be provided with annular grooves, and the disks will be shrunk upon the said journals, the latter at their ends within the bores of the disks being provided with annular projections, which by the shrinking of the disks applied hot to the cold or cooler journals are embraced by the said annular grooves. As the disks applied hot to the journals shrink to take bearing upon the said journals, the projections thereof are embraced by the said annular grooves. The shrinking of the disks on the journals, as described, prevents any torsional movement of the disks on the journals, as well as any end movement of the disks thereon, and enables a cheaper construction than when the cranks or disks form an integral part of the journals.

One feature of my invention consists in the journals and disks carried thereby and provided with chambers having shoulders and a hollow sleeve, combined with a headed pin or bolt extending through the said disks and sleeve, substantially as will be described.

Other features of my invention will be hereinafter described, and pointed out in the claims at the end of this specification.

Figure 1 in elevation and partial section shows a crank-shaft embodying my invention, the shaft being broken out to save space on the drawings; and Fig. 2, a partial end elevation of Fig. 1, looking toward the left.

The crank-shaft is composed of two rods or journals, $a$ $a'$, having disks or cranks $a^2$ $a^3$ connected thereto and with each other, as will be described. The journals $a$ $a'$ may be of usual length and in practice carry a fly-wheel or other usual parts and be supported in bearings on the engine-frame in usual manner.

The journals $a$ $a'$, preferably of steel, are herein shown as provided each with an annular projection, $a^7$, and a shoulder, $m$. The disks are bored in usual manner, and each bore is provided with an annular groove, 3. The disks are heated and expanded before they are applied to the journals $a$ $a'$, the latter being cooler, and as the disks cool and shrink the grooved portion of the bore of each disk is made to embrace snugly a projection, $a^7$, of a journal, thus firmly securing the said disks to the journals $a$ $a'$, the cylindrical portions of the bore of the disks at the sides of the groove therein coming firmly in contact with the surface of the journals $a$ $a'$, outside the projections $a^7$. When the disks are applied, they are pushed against shoulders $m$ on the journals. The disks shrunk, as described, upon the journals $a$ $a'$, are securely held against any torsional movement or strain, and also against any end motion of the disks with relation to the journals. The disks may be further secured, if desired, to the journals by a key, as $b$. Each disk is provided with a hole of varying diameter to leave a shoulder, $b^3$, and preferably a shoulder, $b^{10}$. Each shoulder $b^3$ serves to receive against it one end of a hollow sleeve, $a^4$, while the shoulders $b^{10}$, if used, receive against them flanges $b^{12}$ of the said sleeve. The outer sides of the disks are shown as provided with countersinks, as 8, to receive the under sides of the heads of the bolt.

In practice, the disks, chambered as described, are forced upon the ends of the sleeve $a^4$, and thereafter a bolt, $a^5$, while hot, is extended through the said disks and the said sleeve, and the ends of the heated bolt are then headed, as represented, the portions of the bolt underneath its head filling the counter-sinks 8. As the said bolt cools it contracts, and the shoulders $b^3$ of the disks and the ends of the sleeve are firmly and powerfully drawn together, and so also the flanges $b^{12}$ and the shoulders $b^{10}$, if used, are firmly drawn together. The disks may be further united to the said sleeve by keys $b^7$, inserted in usual manner.

The sleeve and bolt connection may be employed to connect the disks whatever be the manner of uniting the disks and journals, and even when a disk and a journal are in one integral piece, as now common.

I claim—

1. The journals, and disks carried thereby, provided with chambers having shoulders $b^3$, combined with the hollow sleeve to abut against the said shoulders, and the headed pin or bolt extended through the said sleeve and disks, substantially as described.

2. The journals, and the disks secured thereto, and provided with chambers having shoulders $b^3$, and countersinks 8, combined with the hollow sleeve, and the bolt extended through the disks and sleeve and filling the said countersinks, substantially as described.

3. The journals and their connected disks, provided with chambers having shoulders $b^3$ and $b^{10}$, and the sleeve having flanges $b^{12}$, combined with the bolt extended through the said disks and sleeve to hold them together snugly, substantially as described.

4. The combination, with the journals having each an annular projection, of the disks each having a bore provided with an annular groove to embrace the annular projection, and each provided with a chamber having a shoulder, $b^3$, and the hollow sleeve and headed pin or bolt extended through the said sleeve and disks, substantially as described.

In testimony whereof I have signed my name to this specification in the presence of two subscribing witnesses.

CHARLES FOSDICK.

Witnesses:
WILLIAM I. CLIFFORD,
FREDERICK FOSDICK.